(12) United States Patent
Ni et al.

(10) Patent No.: US 7,667,155 B1
(45) Date of Patent: Feb. 23, 2010

(54) ELECTRICAL DIMMER CONTROL SWITCH

(75) Inventors: Lidong Ni, Zhejiang (CN); He Mian Xiao, Zhejiang (CN)

(73) Assignee: Zhejiang Yuelong Mechanical and Electrical Co. Ltd., Zhejiang (CN)

( * ) Notice: Subject to any disclaimer, the term of this patent is extended or adjusted under 35 U.S.C. 154(b) by 0 days.

(21) Appl. No.: 12/324,800

(22) Filed: Nov. 26, 2008

(51) Int. Cl.
*H01H 21/00* (2006.01)

(52) U.S. Cl. .................. 200/556; 200/331; 200/553

(58) Field of Classification Search .............. 174/66, 174/67; 200/553, 556, 557, 330, 331, 296
See application file for complete search history.

(56) References Cited

U.S. PATENT DOCUMENTS

| | | | | |
|---|---|---|---|---|
| 4,242,552 | A * | 12/1980 | Tibolla | 200/339 |
| 4,401,864 | A * | 8/1983 | Ichikawa | 200/17 R |
| 4,880,950 | A * | 11/1989 | Carson et al. | 200/547 |
| 5,290,983 | A * | 3/1994 | Roberts et al. | 200/557 |
| 5,957,270 | A * | 9/1999 | Ahn | 200/331 |
| 6,355,893 | B1 * | 3/2002 | Ikunami | 200/339 |
| 6,388,221 | B1 * | 5/2002 | Rudolph et al. | 200/556 |
| 6,891,117 | B1 * | 5/2005 | Gouhl et al. | 200/339 |
| 7,026,565 | B1 * | 4/2006 | Lee | 200/339 |
| 7,265,308 | B2 * | 9/2007 | Endres et al. | 200/339 |

\* cited by examiner

*Primary Examiner*—Michael A Friedhofer (57) ABSTRACT

An electrical rocker paddle switch assembly having a switch housing; a manually movable rocker paddle coupled to the housing; an actuator having a first end and a second end, the actuator being attached to the rocker paddle at the first end and the second end configured to activate a switch in response to a corresponding movement of the rocker paddle; a bored member having a first end that is attached to an underside of the rocker paddle near a pivot axis of the rocker paddle, and a second end that has an opening configured to retain a roller member and allow a portion of the roller member to extend beyond an end of the bored member, the bored member extending in a substantially perpendicular direction from the rocker paddle. A spring and a ball are configured to be retained in the bored member, the spring configured in the bored member to urge the ball towards the opening. A detent member is formed along a bottom of the housing, the detent member being configured to contact the ball when a force is exerted on the rocker paddle, the detent member being further configured to retain the rocker paddle in a pre-determined position corresponding to the force that is exerted on the rocker paddle when the rocker paddle reaches an end position in a direction of movement.

17 Claims, 6 Drawing Sheets

ELECTRICAL DIMMER CONTROL SWITCH

BACKGROUND

1. Field

The disclosed embodiments relate to improvements in switch-actuating and dimmer control devices for controlling electrical power applied to a load, in particular, a load which is adapted to operate at different power levels, such as electrical lamps, fans, etc.

2. Brief Description of Related Developments

A wide variety of switch actuators are commercially available for controlling the switching of power between a power source and an electrical load. Many of these actuators either incorporate or are otherwise combined with a device for varying the level of power applied to the load, hereinafter referred to as a "dimming" device or "dimmer." To enhance the appearance of the switch and dimmer actuators (which are often independent members), especially those intended for use in the home, it is known to surround or "frame" the actuators with a rectangular bezel. The bezel housing is usually attached to a "yoke" or "strap" which, in addition to functioning as the means by which the switch/dimmer is connected to a conventional wall box, sometimes serves as a platform for supporting the switch and/or dimmer components.

Such devices can comprise a relatively large, rectangularly shaped switch/dimmer actuator which is supported and surrounded by a rectangular bezel. The bezel, which is made of plastic, is releasably connected to a mounting plate by a plurality of resilient tabs which engage apertures in the mounting plate. The switch/dimmer can be of the "capacitance" type, comprising solid state touch-sensitive circuitry for controlling the light level. The switch/dimmer actuator is generally made of metal and is immovably positioned within the bezel frame. One touch of the actuator by the user's finger causes the switch to turn on or off, depending on its original state. Touching and holding the actuator acts to vary the power level applied to the load. When the dimmer is off, one touch restores the power to the load at the same level at which the dimmer was last touched.

SUMMARY

The aspects of the disclosed embodiments are directed to an electrical rocker paddle switch assembly. In one embodiment the assembly comprises a switch housing; a manually movable rocker paddle coupled to the housing; an actuator having a first end and a second end, the actuator being attached to the rocker paddle at the first end and the second end configured to activate a switch in response to a corresponding movement of the rocker paddle; a bored member having a first end that is attached to an underside of the rocker paddle near a pivot axis of the rocker paddle, and a second end that has an opening configured to retain a roller member and allow a portion of the roller member to extend beyond an end of the bored member, the bored member extending in a substantially perpendicular direction from the rocker paddle. A spring and a ball are configured to be retained in the bored member, the spring configured in the bored member to urge the ball towards the opening. A detent member is formed along a bottom of the housing, the detent member being configured to contact the ball when a force is exerted on the rocker paddle, the detent member being further configured to retain the rocker paddle in a pre-determined position corresponding to the force that is exerted on the rocker paddle when the rocker paddle reaches an end position in a direction of movement.

The invention and its various advantages will be better understood from the ensuing detailed description of preferred embodiments, reference being made to the accompanying drawings in which like reference characters denote like parts.

DETAILED DESCRIPTION OF THE EMBODIMENTS

Figures 1A, 1B, 1C:
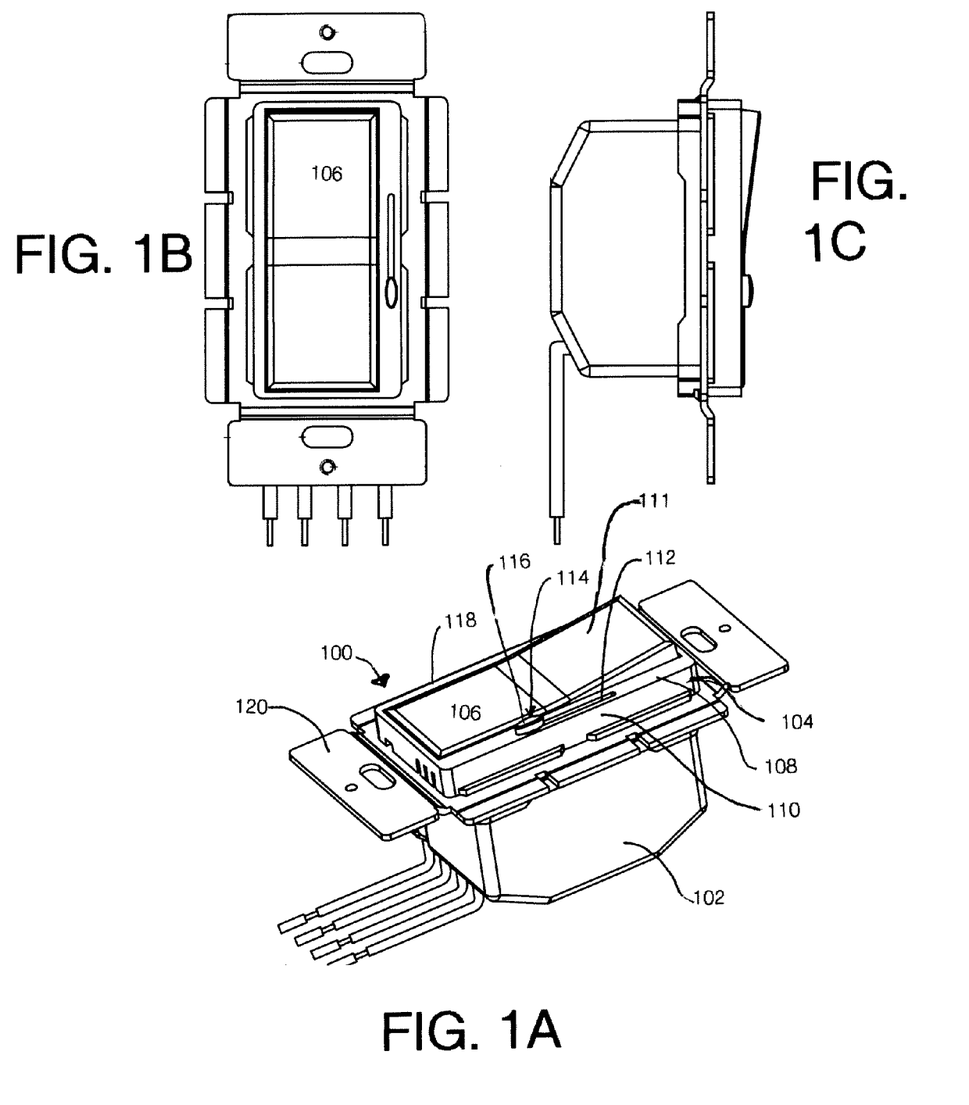
FIGS. 1A-1C are perspective, front and side plan views of a wall switch embodying the present invention.

Referring to FIGS. 1A-1C, one example of an electrical switch and dimmer device 100 incorporating aspects of the disclosed embodiments is illustrated. In one embodiment the device 100 includes a backcover 102, and a bezel assembly 104 which includes a switch-actuating paddle 106. Bezel assembly 104 comprises a bezel housing 108 having a rectangular outer shape adapted to be received in a corresponding opening in a faceplate (not shown). In one embodiment, the bezel housing 108 is adapted to be connected or coupled, such as by a snap connection, to a mounting plate 120.

Figure 2:
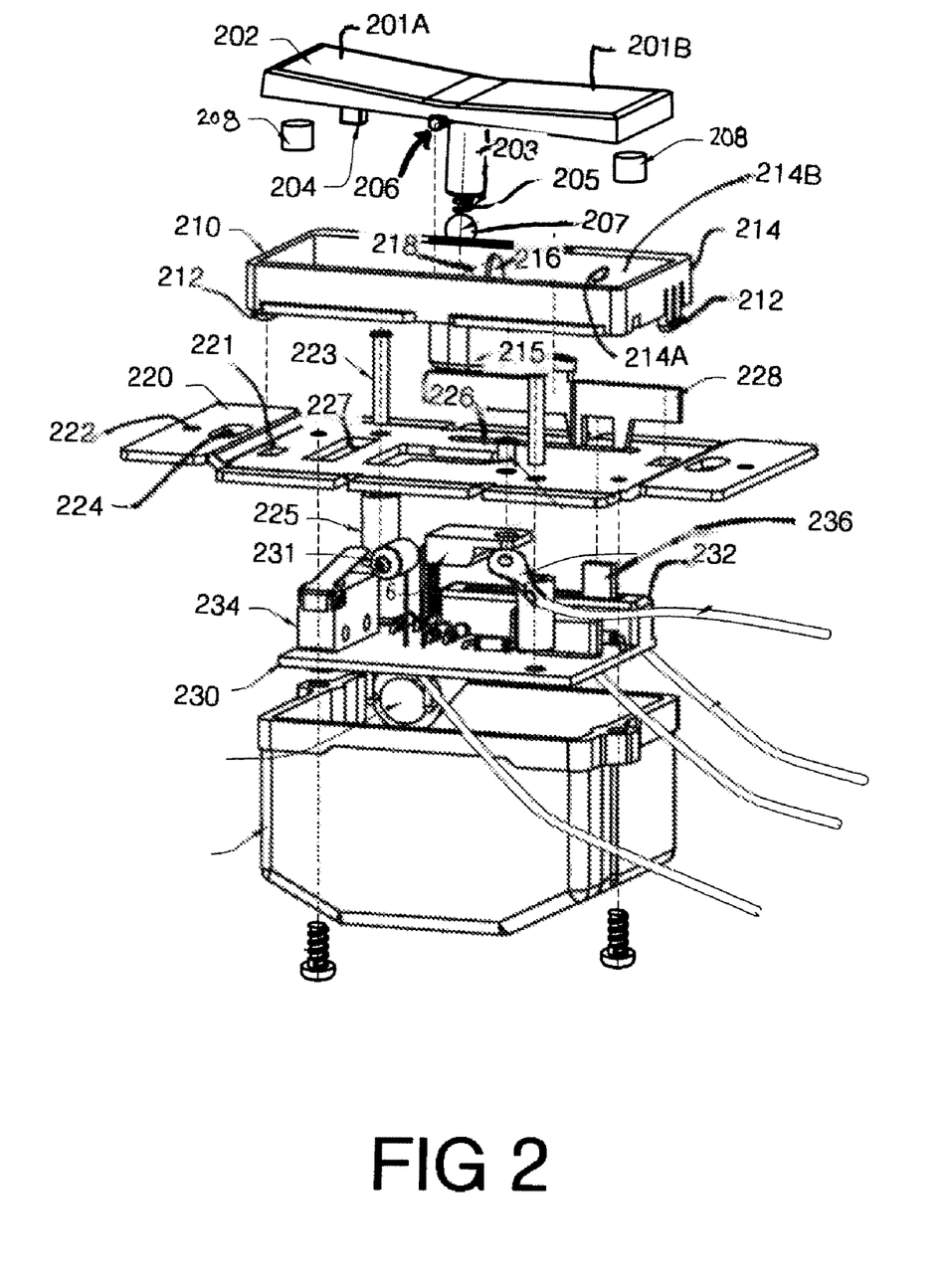
FIG. 2 is an exploded view of the wall switch of FIGS. 1A-1C, showing the various elements of one embodiment of the invention and their relationship to other parts of the wall switch.

In one embodiment, a sidewall 110 of bezel housing 108 is provided with a slot 112 for receiving and guiding a dimmer actuator 114, shown as a small tab or push slide 116, of a dimmer device 232, shown in FIG. 2.

The various components of the switch and dimmer device 100 are illustrated in FIG. 2.

The mounting plate shown in FIG. 2 can include threaded openings 222 by which a conventional faceplate may be attached by screws in the usual manner. Alternatively, a snap-on faceplate, which mounts to mounting plate 220 without screws, may be used. Mounting plate 220 can also includes openings 224 by which the entire switch and dimmer device may be rigidly connected to a conventional wall box (not shown). The mounting plate 220 can support a component plate or platform 230 on which may be mounted the electrical and/or electronic circuitry, such as that normally associated with a dimming device 232. The component plate 230 can also support a switch 234 that is actuated by paddle 202, as will be described in greater detail below.

The mounting plate 220 also includes a rectilinear slot 226 formed therein. The manually-manipulatable dimming actuator 228 operates through slot 226 to engage a slidably mounted member 236, whose position determines the variable resistance comprising the dimming device 232. The sliding movement of the actuator 228 controls the position of member 236 and the power level applied to the load.

As shown in FIG. 2, the bezel assembly 210 may be attached to the mounting plate 220 in any conventional manner. In one embodiment, the bezel assembly 210 is molded as a single plastic piece and is provided with integral resilient tabs 212 which snap into corresponding openings 221 in mounting plate 220. Similarly, component plate 230 can be formed as a single plastic piece and is provided with integral resilient tabs (not shown) which snap into corresponding openings in the mounting plate 220. In the example shown in FIG. 2, rivets 223 are used in conjunction with bushings 225 and corresponding receiving holes to secure the component plate 230 to the mounting plate 220.

The switch 234 is activated by tab 204 of paddle 202. The tab 204 projects through a corresponding opening 227 in mounting plate 220. The bezel assembly 210 is also provided with an opening in order to accommodate the tab 204.

The bezel assembly 210 has a peripheral wall 214 that extends around substantially the entire periphery of the bezel assembly 210. The oppositely-facing inner surfaces of opposing wall portions 214A and 214B are a pair of axle receivers 216, which together define a pivot axis 218. A pair of stub axles 206 are found on the sides of the paddle 202, that engage respective axle receivers and allow the paddle 202 to pivot about the axis 218.

The paddle 202 is pivotably mounted on stub axles 206 for pivotable movement about axis 218. The bezel assembly 210 has on its inner surface 214A and 214B a pair of semicircular recesses for pivotably receiving stub axles 206 therein. A pair of limit stops 208 are provided to limit the pivoting movement of paddle 202 to a range between first and second positions corresponding to first and second switch states. In one embodiment, the limit stops comprise rubber assemblies to provide quiet operation of the switch assembly.

Figure 3A:
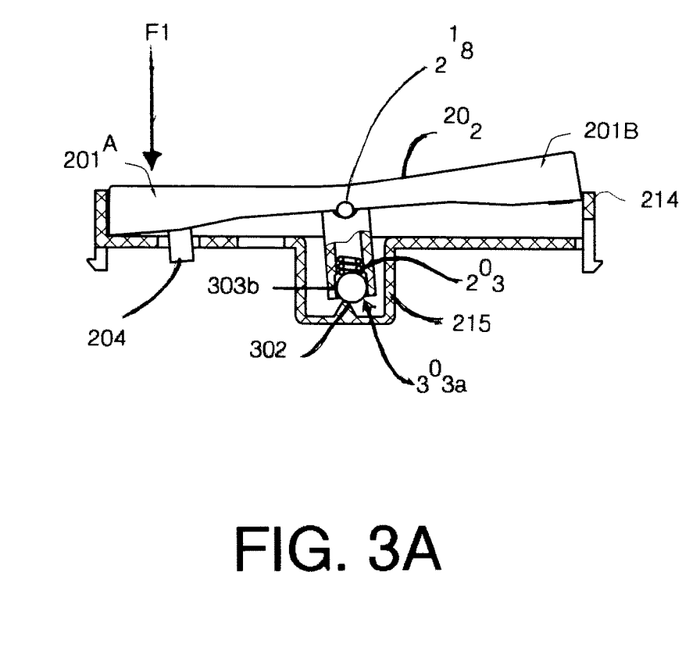
FIGS. 3A and 3B are side views of a bezel assembly including aspects of the disclosed embodiments.

In one embodiment, the paddle 202 is also provided on its inner surface with a spring receiver or cylinder 203 for receiving and retaining spring 205. The cylinder 203 is located substantially at a midpoint of the paddle 202, in-line with the pivot assembly 206. One end of the spring 205 is urged against an underside surface of the paddle 202. The other end of the spring 205 is urged against, coupled to, or in contact with a spherical or roller mechanism 207, also referred to herein as a ball. The roller mechanism 207 is retained or captured in an open end, or hole 203a, of the cylinder 203 as shown in FIG. 3A. In one embodiment, the roller mechanism 207 comprises a steel ball. In alternate embodiments, the roller mechanism 207 can comprise any suitable material that provides durability and free movement of the roller mechanism. Preferably, the roller mechanism 207 does not have any seams that might interfere with movement or rotation of the roller mechanism against a surface, or prevent an object from moving or sliding along a surface of the roller mechanism 207. Although the aspects of the disclosed embodiments will be described herein with respect to a spherical roller mechanism, such as a steel ball, in alternate embodiments, any suitable shape can be used that allows for rotational movement, such as for example a cylindrical shape.

Figure 3B:
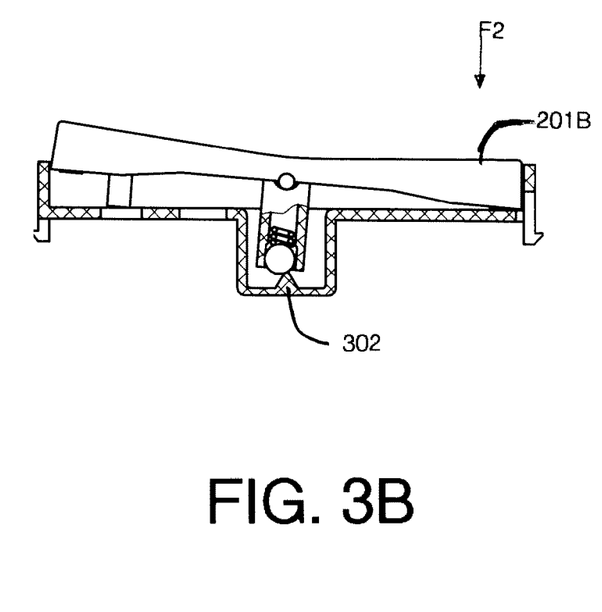

In one embodiment, the spring 205 and steel ball 207 are located within a bored cylinder 203 that is positioned in approximately the middle area of the paddle 202 and bezel assembly 210 as shown in FIG. 2. The metal sphere or ball 207 is retained within the bored cylinder 203 against the pressure of the spring 205. As shown in FIG. 3A, a portion of the ball 207 protrudes past an end portion or hole 303a of the cylinder 203. The ball 207 falls partially into the hole in the cylinder 203 under the pressure of the spring 205, with the spring 205 holding the ball 207 in this position. The ball 207 is configured to move upwards, or back into region 303b of the cylinder 203, when a force is exerted against the ball 207. As shown in FIGS. 3A and 3B, in one embodiment, an inner area of region 303b of the cylinder 203 is bored slightly wider to accommodate the size of the ball 207. Thus, the ball 207 can only travel a pre-determined distance back into the bore 303b of the cylinder 203 when pressure is exerted on it.

The paddle assembly 202, in combination with the spring 205 and ball 207 assemblies form an actuation mechanism of the dimmer switch 234. Referring to FIGS. 3A and 3B, the pressure of the spring 205 against the ball 207 will hold the paddle assembly in one of two positions. As shown in FIGS. 3A and 3B, detent 302 is formed at the bottom of the receiver 215, substantially in-line with the pivot axis assembly 218. In one embodiment, the detent 302 has a triangular shape. As shown in FIGS. 3A and 3B, the side faces of the detent 302 can be angled against the direction of rotation of the paddle 202 about the axis 218.

For example, when force F1 is exerted on end 201A of paddle 202 to move end 201A into the position shown in FIG. 3A, the ball 207 will be urged against, or rest against the corresponding angled side face of detent 302. As described earlier, in this position, the tab 204 is urged against the microactive switch inner side.

The force exerted by spring 205 on ball 207 will hold the position of the paddle 202 as shown in FIG. 3A until a force that exceeds a pre-determined force is exerted on the other end, 201B, of the paddle 202. From the original position of paddle 202 shown in FIG. 3A, when force F2 is exerted on the paddle end 201B, the paddle 202 will rotate about the axis 218 to the position shown in FIG. 3B. As pressure F2 is applied and the paddle 202 rotates about the axis 218, the detent 302 will be urged against the ball 207. The force F2 must be sufficient to push ball 207 back into the cylinder 203, compressing spring 207, and allowing the paddle 202 to rotate to the position shown in FIG. 3B. When the position of the ball 207 has rotated past the detent 302, the pressure of the spring 205 urges the ball 207 back into the hole 303a in the cylinder 203. The size or area of the bore of the region 303b also allows the ball 207 to spin or rotate to provide a smooth switching action of the paddle 202.

When the ball 207 moves past the apex of the detent 302, the force of the ball 207 against the detent 302 will hold or lock the paddle in the corresponding position. In one embodiment, the angle of movement of the paddle 202 and ball 207 is in the range of approximately 5 to 20 degrees. In the preferred embodiment, the range is approximately 9 degrees.

Although the detent 302 shown in FIGS. 3A and 3B comprises a triangular shape, in alternate embodiments, any suitable shape can be used that will push against and retain the ball 207 in the respective positions shown in FIGS. 3A and 3B. The aspects of the disclosed embodiments provide a fluent and quiet action of the paddle 202 when the paddle 202 is moved from one position to the other.

Figure 6A:
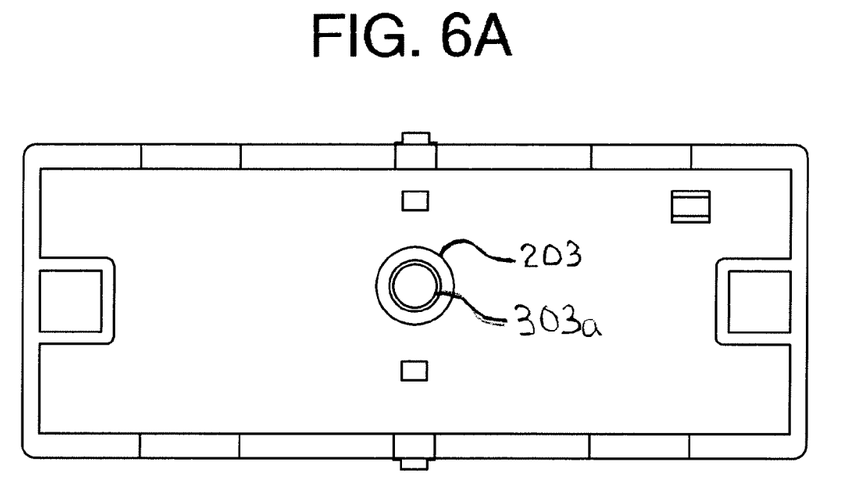
FIG. 6A is a bottom view of one embodiment of the paddle assembly of FIG. 2.
Figure 6B:
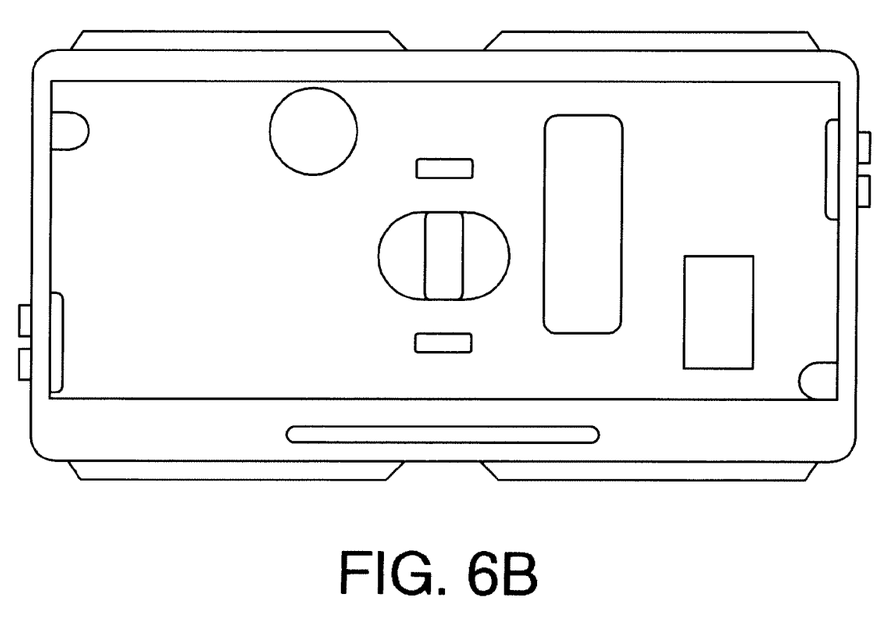
FIG. 6B is an elevational view of one embodiment of the bezel assembly.

The paddle 202 may be of any suitable shape as long as paddle 202 has two opposite ends 201A and 201B, each of which can be actuated by a user. The ends 210A and 201B permit a user to manually apply pressure to paddle 202 to cause it to pivot about axis 218. The outer surface of paddle 202 may be substantially planar, or may be in the form of flat angularly-disposed planes which intersect at the center of paddle 202. In one embodiment, the paddle 202 comprises a thermoplastic material. FIG. 6A illustrates one embodiment of the bottom side of the paddle 202.

In one embodiment, the device 100 can include a nightlight feature. In this embodiment, low voltage is applied to lamp 231 through wires in a conventional manner. Luminous energy from the lamp 231 is directed through an opening in mounting plate 220 and a corresponding opening in a floor of the bezel assembly 210. Upon striking the inner surface of paddle 202, this luminous energy is reflected toward the bezel floor. After multiple reflections between the bezel floor and the inner surface of the paddle, the reflected luminous energy exits the bezel assembly through a clearance space between the outer edges of paddle 202, and the inside edges of bezel assembly 210, including the inner wall surfaces 214A and 214B. To facilitate such multiple reflections, especially in the case where the paddle material is opaque or light-absorbing, it is preferred that the paddle and bezel floor surfaces which receive light from the lamp be provided with a diffuse, reflective material or tape. The diffuse surface operates to scatter the incident light, thereby providing a more uniform light level about the paddle periphery.

To connect paddle 202, spring receiver 203 and spring 205 to bezel housing 210, paddle 202 is oriented with its inner surface facing the floor of the bezel housing 210. Spring 205 is inserted into the recess 215. One end of spring 205 engages the ball 207 and the other end of spring 205 is placed in or on the spring receiver 203. This compresses spring 205 with sufficient force to retain stub axle 206 in the receivers 216.

Operation of the assembled device 100 will now be described with respect to FIG. 1A. To actuate the wall switch 100, the outwardly protruding paddle end 111 is depressed by a user. Depression of end 111 causes paddle 106 to pivotably rotate about axis 218 of FIG. 2. Pressure or force on one end of paddle 106 causes the detent 302 of FIGS. 3A and 3b to press against the ball 207, which causes the spring 205 to constrict. The ball 207 rolls from one side of the detent 302 to the other side, and the paddle 202 is at a resting state in that position. When end 201A of paddle 202 is pressed, the tab 204 actuates the microswitch 234, which applies power to the load, which in one application can comprise a light. To vary the level of electrical current applied by the switch 234 to the load, dimmer actuator 116 manually slides within slot 112 formed in bezel sidewall 110. Movement of the dimmer actuator 116 controls the position of member 236 of FIG. 2, which in turn, varies the resistance of the variable resistor or dimmer device 232.

It should be understood that many modifications to the various parts of the invention may be made without departing therefrom. For example, any style or type of wall plate may be used with the invention, and microswitch 234 is not the only type of switch that may be actuated by paddle 202. Moreover, microswitch 234 need not be directly actuated by tab 204 on paddle 202, but may be directly actuated by an intermediate mechanism or linkage. Also, while a paddle-type actuator is particularly preferred, a similarly shaped push-button-type actuator could be used. In this case, the bezel housing would support the actuator for movement perpendicular to the plane of bezel wall surface 214 and a spring would bias the actuator to an "out" position, in which tab 204 would not operate to depress the switch plunger on switch 234.

Figure 4:
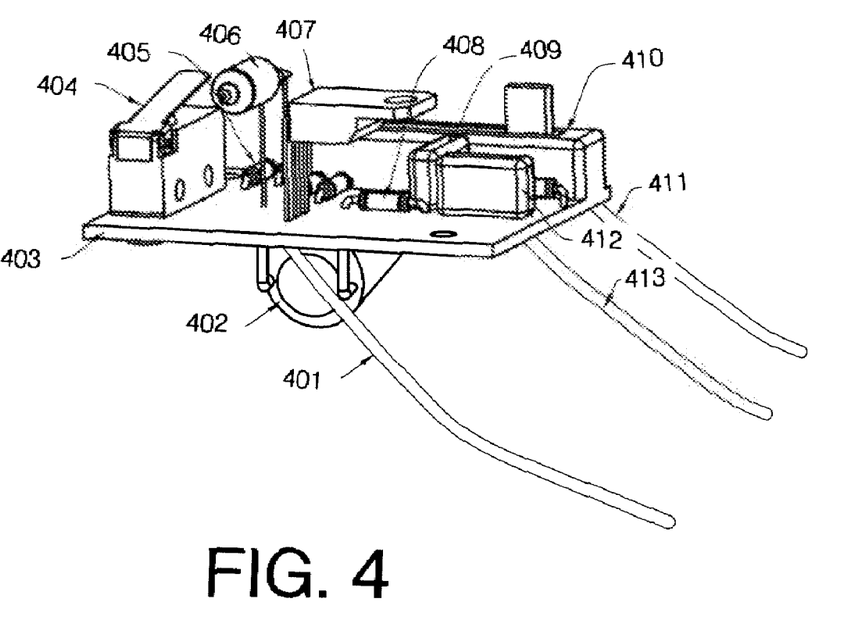
FIG. 4 is a plan view of the one embodiment of the mounting plate of FIG. 2, illustrating internal details.
Figure 5:
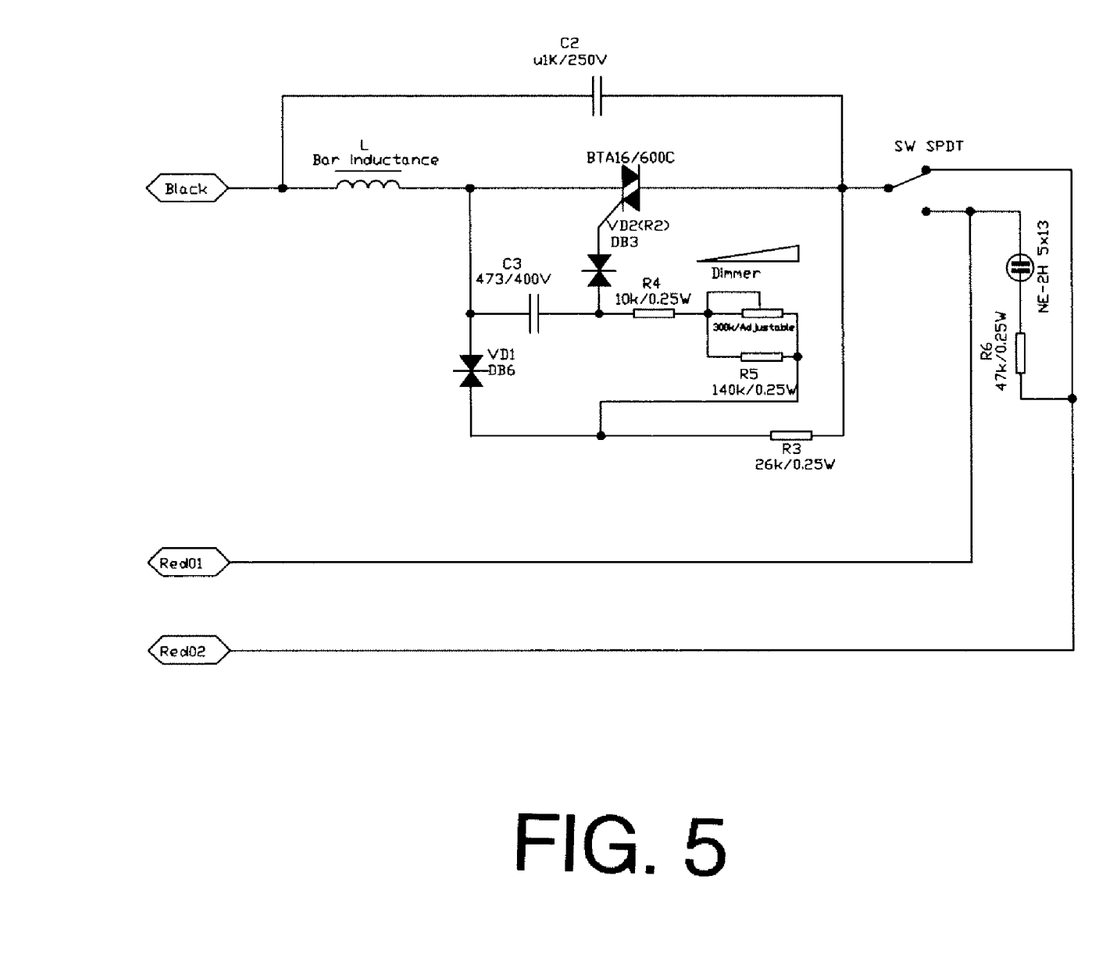
FIG. 5 is a circuit diagram of one embodiment of the electronics of the invention.

Referring to FIG. 4, one embodiment of the component plate 230 of FIG. 2 is illustrated. In one embodiment, the components on the component plate 403 include lead 401, inductor 402, switch 404, resistor 405, neon lamp 406, silicon controlled rectifier 407, bilateral diode 408, capacitor 409, moveable potentiometer 410, lead 411, capacitor 412 and lead 413. An exemplary schematic diagram illustrating the interconnections of the described components in accordance with the disclosed embodiments is shown in FIG. 5.

The compact construction of the electrical switch and dimmer device assembly of the disclosed embodiments provides a simple and room saving arrangement of assemblies on the component plate 403 (printed circuit board), which leaves a larger area between the mounting plate 220 and the component plate 230 shown in FIG. 2. This larger area can provide for greater heat dissipation from the assembly of components that are mounted on the component plate 403.

In one embodiment, the silicon controlled rectifier 407 is mounted in such a fashion on the mounting plate 230 that provides room for heat output and dissipation, which ensure stable power. In one embodiment, as shown in FIG. 2, a heatsink of the silicon controlled rectifier can be coupled to the mounting plate 220 to provide heat dissipation. According to tests, sample results of which are detailed below, the dimmer switch assembly of the disclosed embodiments can maintain a 700 W power factor, whether configured as 1-gang, 2-gang or 3-gang assembly. The ability of this tightly configured component assembly to adequately dissipate heat allows the silicon controlled rectifier 407, together with the other components, to function in a controlled and specific manner.

The switch assembly of the disclosed embodiments can be configured as a single pole device, a three-way device, a single pole lighted device, a three-way lighted device, a magnetic low voltage single pole device, a magnetic low voltage three way device, a magnetic low voltage single pole lighted device or a magnetic low voltage three-way lighted device. Each of these devices and be configured in 1-gang, 2-gang and 3-gang arrangements.

The following is a comparison of the measured power factor of the dimmer device of the disclosed embodiments versus other dimmers in the market:

|  | Our dimmer | Other dimmer in market |
| --- | --- | --- |
| 1 gang | 700 W | 600 W |
| 2 gang | 700 W | 500 W ↓ |
| 3 gang | 700 W | 400 W ↓ |

The heat that is generated from the component assembly 403 during operation, and in particular the silicon controlled rectifier 407, is easily dissipated in the dimmer switch device of the disclosed embodiments, and which allows the dimmer switch device to provide a more stable function. Other devices require larger areas to provide adequate heat dissipation. The unique structure of the component assembly 403 and the mounting of the silicon controlled rectifier 407 provide advantages not seen or realized in the art.

The aspects of the disclosed embodiments provide an actuation mechanism for a dimmer assembly, which can include a thermoplastic paddle. A spring with a steel ball is placed in a cylinder construction in the middle of the cover plate and provides the actuator for the dimmer switch. When the paddle is pushed, the tab on the paddle will actuate the micro-active switch on the inner side. Rubber assemblies on the inner side of the paddle can assure long term operation. The internal structure of the dimmer assembly provides compact construction, with simple and space saving arrangements. This helps in the dissipation of heat generated internally and helps to provide a more stable and constant power factor.

What is claimed is:

1. A switch assembly comprising:
 a mounting plate having at least one mounting opening therein for connecting the mounting plate to an electrical wall box;
 an electrical switch adapted to selectively apply power to a load from a power source, the switch assembly being supported by the mounting plate and having a switch actuator which is selectively operable to control an on/off state of the electrical switch;
 a dimmer adapted to control a level of power applied to the load, the dimmer being supported by the mounting plate and having a dimmer actuator which is selectively operable to control the level of power applied to the load by the switch;
 a backcover secured to the mounting plate, the backcover and mounting plate cooperating to form an enclosure to house the electrical switch assembly and the dimmer; and
 a bezel assembly comprising:
 a bezel housing;
 a first manually-manipulatable member movably mounted directly on and retained by the bezel housing and operatively coupled to the switch actuator when the bezel assembly is connected to the mounting plate, for selectively controlling an operation of the switch actuator;
 a spring and ball retaining assembly formed on an underside of the first manually manipulatable member, the retaining assembly configured to hold a spring device engaged with a spherical member at an end away from the first manually-manipulatable member, the spherical member being retained in the retention member and configured to extend partially through a hole in the end of the retention member away from the first manually manipulatable member when the spring exerts a force on the spherical member;
 a detent member formed on a bottom surface of the bezel housing, the bezel member configured to exert a pressure against the ball assembly to move the ball assembly away from the detent member when the ball assembly is moved over the detent member, the detent member being further configured to hold the first manually-manipulatable member in one of two pre-determined positions depending on a force exerted on the first manually manipulatable member.

2. The switch assembly as defined by claim 1 wherein said first manually-manipulatable member comprises a paddle pivotally mounted on said bezel housing and having a tab member which engages said switch actuator during pivotal movement of said manually-manipulatable member to actuate said electric switch.

3. The switch assembly as defined by claim 1 further comprising a second manually-manipulatable member movably mounted directly on and retained by the bezel housing and operatively coupled to the dimmer actuator when the bezel assembly is connected to mounting plate, for selectively controlling the operation of the dimmer actuator, the bezel assembly being removable with respect to the mounting plate while the mounting plate remains secured to the backcover, and wherein said second manually-manipulatable member is slidably mounted on said bezel housing.

4. The switch assembly as defined by claim 3 wherein said second manually manipulatable member is slidably mounted on said bezel housing and includes means for engaging said slidable member for controlling the position thereof.

5. The switch assembly as defined by claim 1 wherein said dimmer comprises a variable resistance device, and wherein said dimmer actuator comprises a slidable member, the position thereof controlling the resistance of said variable resistance device.

6. The switch assembly as defined by claim 1 wherein said bezel member comprises a wall which surrounds the perimeter of said first manually-manipulatable member.

7. The switch assembly as defined by claim 6 wherein said wall defines a slot in which said second manually-manipulatable member is movable.

8. The switch assembly as defined by claim 6 wherein said mounting plate supports an electric lamp for illuminating a clearance space between said wall and first manually-manipulatable member, whereby the location of the latter is visible in the dark.

9. The switch assembly as defined by claim 8 wherein a surface of said first manually-manipulatable member and a surface of said bezel housing are adapted to diffusely reflect radiation energy emitted by said electric lamp to enhance the illumination of said clearance space.

10. The switch assembly as defined by claim 1, further comprising a component plate between the mounting plate and the backcover, the component plate having electrical circuitry mounted thereon, including the electrical switch and dimmer, wherein a gap is formed between the mounting plate and the component plate that provides heat dissipation, wherein a silicon controlled rectifier is mounted to the component plate, a heatsink of the silicon controlled rectifier being coupled to the mounting plate to provide heat dissipation thereof.

11. The switch assembly as defined by claim 10, wherein the switch assembly can be configured in a single gang, double gang or triple gang configuration, wherein each configuration provides a power factor of substantially 700 watts.

12. An electrical rocker paddle switch assembly comprising:
- a switch housing;
- a manually movable rocker paddle coupled to the housing;
- an actuator having a first end and a second end, the actuator being attached to the rocker paddle at the first end and the second end configured to activate a switch in response to a corresponding movement of the rocker paddle;
- a bored member having a first end that is attached to an underside of the rocker paddle near a pivot axis of the rocker paddle, and a second end that has an opening configured to retain a roller member and allow a portion of the roller member to extend beyond an end of the bored member, the bored member extending in a substantially perpendicular direction from the rocker paddle;
- a spring and a ball configured to be retained in the bored member, the spring configured in the bored member to urge the ball towards the opening;
- a detent member along a bottom of the housing, the detent member being configured to contact the ball when a force is exerted on the rocker paddle, the detent member being further configured to retain the rocker paddle in a pre-determined position corresponding to the force that is exerted on the rocker paddle when the rocker paddle reaches an end position in a direction of movement.

13. The rocker paddle switch assembly of claim 12 further comprising that an area of the bored member in which the ball is located has a diameter that allows the ball to rotate therein.

14. The rocker paddle switch assembly of claim 12 further comprising that the rocker paddle is configured to pivot about an axis located in an approximate midline of the rocker paddle.

15. The rocker paddle switch assembly of claim 12 further comprising that the detent member is in a shape of a triangle and an apex of the triangle is urged against the ball as the rocker paddle rotates from a first position to a second position about the pivot axis.

16. The rocker paddle switch assembly of claim 15 further comprising that the apex of the triangle is configured to rest at a position to a side of the ball, when the ball is urged into the opening in the bored member, the apex of the triangle configured to retain the rocker paddle in the corresponding position until a force is exerted on the rocker paddle in an opposing direction to a current resting position.

17. The rocker paddle switch assembly of claim 12 wherein the bored member comprises a cylinder.

* * * * *